US010102354B2

(12) United States Patent
Wessling et al.

(10) Patent No.: US 10,102,354 B2
(45) Date of Patent: Oct. 16, 2018

(54) INTEGRATED APPLICATION FEATURE STORE

(75) Inventors: Cynthia D. Wessling, Redmond, WA (US); Steven William Macbeth, Redmond, WA (US); Danny Lange, Sammamish, WA (US); Zhaowei (Charlie) Jiang, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1815 days.

(21) Appl. No.: 12/950,828

(22) Filed: Nov. 19, 2010

(65) Prior Publication Data

US 2012/0131470 A1    May 24, 2012

(51) Int. Cl.
G06F 21/10 (2013.01)
G06F 21/12 (2013.01)
G06Q 30/06 (2012.01)
H04L 29/06 (2006.01)

(52) U.S. Cl.
CPC .......... G06F 21/105 (2013.01); G06F 21/128 (2013.01); G06Q 30/0601 (2013.01); H04L 63/0281 (2013.01); H04L 63/102 (2013.01); G06F 2221/2137 (2013.01); G06F 2221/2141 (2013.01)

(58) Field of Classification Search
CPC ............ G06Q 30/0601; G06F 17/3005; G06F 17/30867; G06F 17/30985; G06F 2221/2147; G06F 21/53; G06F 21/105; G06F 21/128; G06F 2221/2137; G06F 2221/2141; H04L 63/0281; H04L 63/102
USPC ............................ 715/739, 733, 738; 726/26
See application file for complete search history.

(56) References Cited

U.S. PATENT DOCUMENTS

| 7,069,271 | B1 | 6/2006 | Fadel et al. |
| 7,356,590 | B2 | 4/2008 | Wilson et al. |
| 8,364,694 | B2* | 1/2013 | Volkert ............. G06F 17/30029 707/767 |
| 2005/0216287 | A1 | 9/2005 | Crosby et al. |
| 2006/0048132 | A1* | 3/2006 | Chen ...................... G06F 21/10 717/168 |
| 2006/0174319 | A1* | 8/2006 | Kraemer ................ G06F 21/53 726/1 |
| 2008/0109801 | A1 | 5/2008 | Levine et al. |
| 2008/0250323 | A1* | 10/2008 | Huff ....................... G06F 9/4446 715/733 |
| 2010/0235254 | A1* | 9/2010 | Mirrashidi ............ G06F 21/125 705/26.1 |
| 2010/0299219 | A1* | 11/2010 | Cortes ..................... G06F 9/445 705/26.35 |
| 2011/0078801 | A1* | 3/2011 | Bae ................... G06F 17/30056 726/29 |
| 2011/0246290 | A1* | 10/2011 | Howard et al. ............ 705/14.49 |

OTHER PUBLICATIONS

Duncan Campbell, "iPhone Application Development for iOS 4: Visual QuickStart Guide," Sep. 2010, pp. 181 and 194.*

(Continued)

Primary Examiner — Andrew L Tank
(74) Attorney, Agent, or Firm — Schwegman Lundberg & Woessner, P.A.

(57) ABSTRACT

An application feature store may be integrated with an application. The feature store may be accessed by a user through a feature storefront hosted within the application. The user may search the feature store for additional desired features available for the augmentation of the productivity application.

20 Claims, 12 Drawing Sheets

(56) References Cited

OTHER PUBLICATIONS

Fekete Gyorgy, "Designing the Holy Search Box: Examples and Best Practices," Dec. 2008, 23 pages.*
"Adding a Store to Your Application", retrieved on Aug. 11, 2010 at <<http://developer.apple.com/iphone/library/documentation/NetworkingInternet/Conceptual/StoreKitGuide/AddingaStoretoYourApplication/AddingaStoretoYourApplication.html>>, Apple Inc., Jun. 14, 2010, pp. 1-3.
"D2 StoreFront 1.23", retrieved on Aug. 11, 2010 at <<http://www.brothersoft.com/d2-storefront-284527.html>>, BrotherSoft.com, D2 Computing Limited, Sep. 8, 2009, pp. 1-5.
"EFI Digital StoreFront", retrieved on Aug. 11, 2010 at <<http://www.ricoh-usa.com/solutions/digitalstorefront/brochures/DSF_brochure.pdf>>, Electronics for Imaging, 2009, pp. 1-8.
"Microsoft Dynamic Systems Initiative Overview", retrieved on Aug. 11, 2010 at <<http://download.microsoft.com/download/e/5/6/e5656886-ad18-4afd-945f-3680278dfd58/DSI%20overview.doc>>, Microsoft Corporation, Windows Server—System White Paper, Mar. 2004, pp. 1-29.
Reardon, "Nokia announces Ovi Application store", retrieved on Aug. 11, 2010 at <<http://reviews.cnet.com/8301-13970_7-10164838-78.html>>, CNET Reviews, Feb. 16, 2009, pp. 1-3.
Webster, Scott "Amazon throws hat into Android app store ring" retrived on Oct. 1, 2010 at http://www.cnet.com/8301-19736_1-20018078-251.html, CNet, Sep. 29, 2010, 2 pages.

* cited by examiner

INTEGRATED APPLICATION FEATURE STORE

Productivity applications are some of the most widely used applications in the computing world today. As such, users are continuously looking to purchase productivity applications that are more user friendly and contain a greater variety of features that suit their needs. At the same time, the internet provides users the option to access free applications with comparable basic functionality. Cost-conscious purchasers are examining the value between paying for a full-fledged application where they use only a fraction of the features versus that of downloading a free application containing a more limited feature set.

Furthermore, users will often find that the productivity application that they purchased or downloaded for free is missing one or more desirable features. Users may install what are generally referred to as add-in features to their existing productivity application. However, acquiring additional functionality is currently an external process disconnected from the application, often causing the user a disjointed download/install process, only to end up with a feature that does not fully integrate with the base application. For example, if the user would like to add-in a feature enabling the use of multiple languages, they would have to search locations such as the World Wide Web (hereinafter "WWW") in order to find the particular add-in they are looking for. Once the add-in has been downloaded and incorporated into the particular productivity application, the add-in functions are static and often function in a different manner than the base application causing an unpleasant user experience.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

This disclosure describes accessing an application feature store from within an application.

In an exemplary implementation, a feature store is provided in a productivity application. The feature store may be accessed by a user through a feature storefront integrated within the productivity application. The user may be redirected to the integrated feature storefront when the user is trying to use a specific feature that is not yet installed but that is available from the feature store. The user may search the feature store for additional desired features available for the augmentation of the productivity application. The feature storefront may present the user with the features available for purchase, for free, and/or for trial, and may facilitate the installation of the feature within the productivity application. The installation process is a seamless process, such that, in some instances, a user is unable to identify any difference between a purchased feature and/or a feature original to the productivity application.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

When using a productivity application, a user often finds there are features that they would like to have access to. However, to add these features it is cumbersome and time consuming to search and find where and what is available. Furthermore, if a desired feature is located, once the feature is added to the original productivity application, the feature may perform poorly. For example, the feature may not be able to access features original to the productivity application, or the user may not be able to access all of the features because they are not compatible with the user's version of the productivity application. This is both frustrating and time consuming for the user.

This application describes integration of an application feature store to allow simple and seamless, addition of features to an application. More specifically, a feature store is integrated with and utilized by a productivity application. The feature store may be accessed by a user through a feature storefront hosted within the productivity application. The user may search the feature store for additional desired features available for the augmentation of the productivity application.

Exemplary Environment

Figure 1:
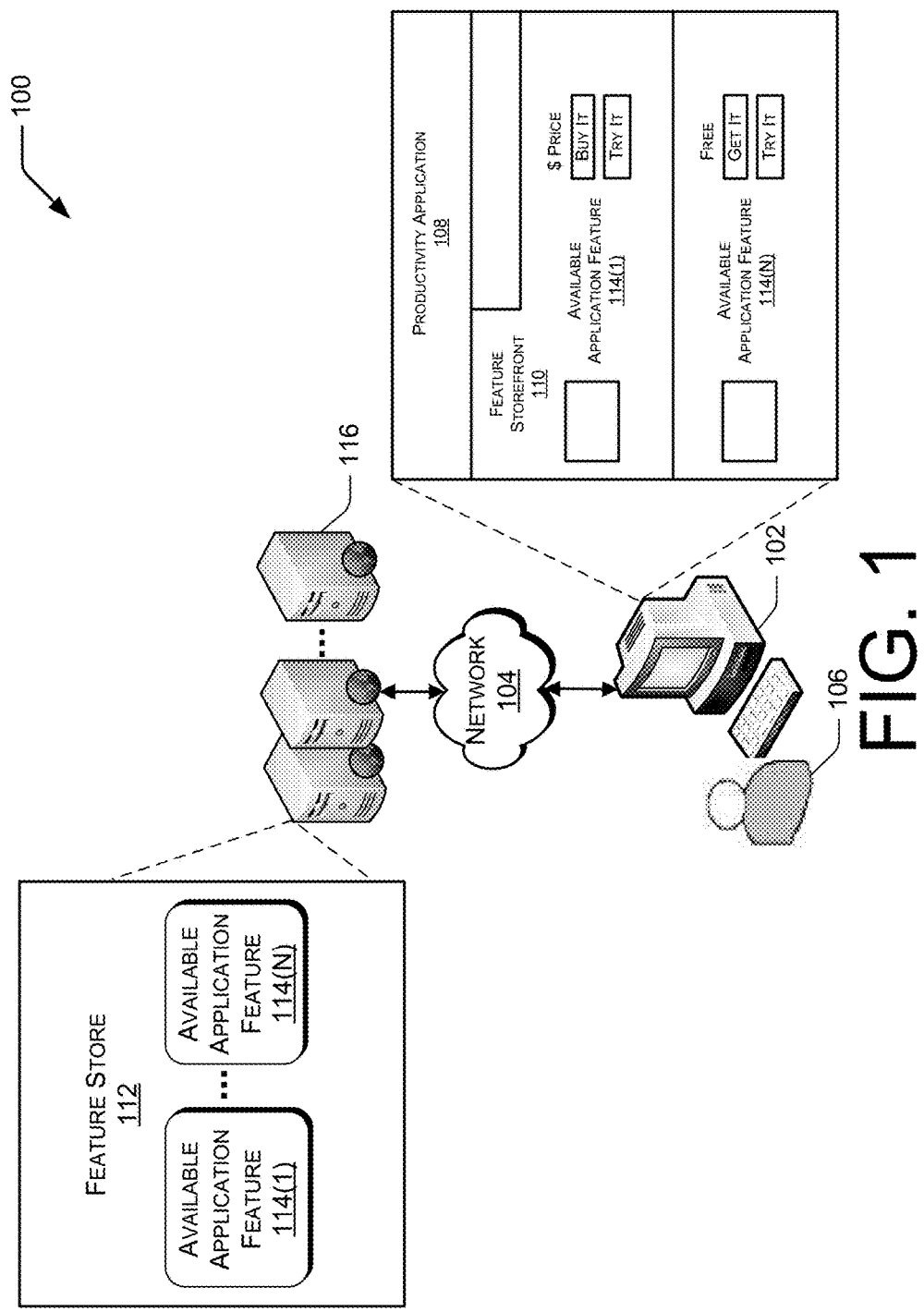
FIG. 1 is a schematic of an illustrative environment for an application feature storefront and an application feature store.

FIG. 1 is a block diagram of an exemplary environment 100, which is used for an integrated application feature store. The environment 100 includes an exemplary computing device 102, which may take a variety of forms including, but not limited to, a portable handheld computing device (e.g., a personal digital assistant, a smart phone, a cellular phone), a laptop computer, a desktop computer, a tablet computer, a netbook, a media player, a gaming console, a digital camcorder, an audio recorder, a camera, or any other computing device.

The computing device 102 may connect to one or more networks(s) 104 and is associated with a user 106. The network(s) 104 represent any type of communications network(s), including, but not limited to, wire-based networks and/or wireless networks.

The computing device 102 enables the user 106 to access and operate a productivity application 108 or other client application. For example, the productivity application 108 may be, without limitation, an application such as a word processing application, a spreadsheet application, an email application, or the like. As used herein the productivity application 108 is a basic application with limited functionality. For example, the user 106 may initially be provided with a Microsoft Word application that enables the user to perform only a small number of word processing features such as, without limitation, changing font, type size, spacing, and the like.

The productivity application 108 may include an application feature storefront 110. The application feature storefront 110 may be hosted within the productivity application 108 and offers a portal to a feature store 112, permitting the user 106 to access the feature store 112 without exiting the productivity application. The application feature storefront 110 may offer, without limitation, access to one or more available application features 114(1)-114(N) offered to augment the productivity application 108. The application feature storefront 110 may also include access to a price associated with each available application feature and access to an option to buy the available application feature or try the available application feature on a trial basis. Additionally or alternatively, application features may be available for free.

The available application features 114(1)-114(N) may be accessed over the network 104. For example, in some instances, when the user 106 opts to buy the available application feature 114(1), activation of the "buy it" option directs the productivity application 108 to access the available application feature 114(1) from the feature store 112 stored on a server 116. The feature store 112 communicates the necessary information for download and installation of the purchased available feature 114(1) over network 104 to the productivity application 108. In other instances, activation of the "buy it" option permits the productivity application 108 to unlock the requested available feature(s), which are already installed on the users local PC, but are locked or otherwise not available for use. The available feature(s), for example, may be encrypted and/or may require a security credential (e.g., password, biometric scan, or the like) to access.

The available application features 114(1)-114(N) may be features provided by, without limitation, a third party independent software vendor (ISV) or may be provided by the publisher of the base application. The publisher may upload the available application features to the application feature store 112. The available application features 114(1)-114(N) may include a metadata in XML format, giving the application feature store context about what this particular available application feature can do and how the available application feature behaves.

One example implementation may be that the user 106 is using a basic word processing application, such as, Microsoft Word® available from Microsoft Corporation of Redmond, Wash. During operation, the user 106 may determine that there is a need to translate the current document from English to French. Such a translation feature may not be included in the basic productivity application 108. Therefore, the user 106 may access the hosted application feature storefront 110 to select an appropriate available application feature that encompasses the translation feature(s) the user 106 desires. After locating the available application feature(s), the user 106 may choose to try the features out, or choose to buy and incorporate the translation features into the productivity application 108.

Figure 2:
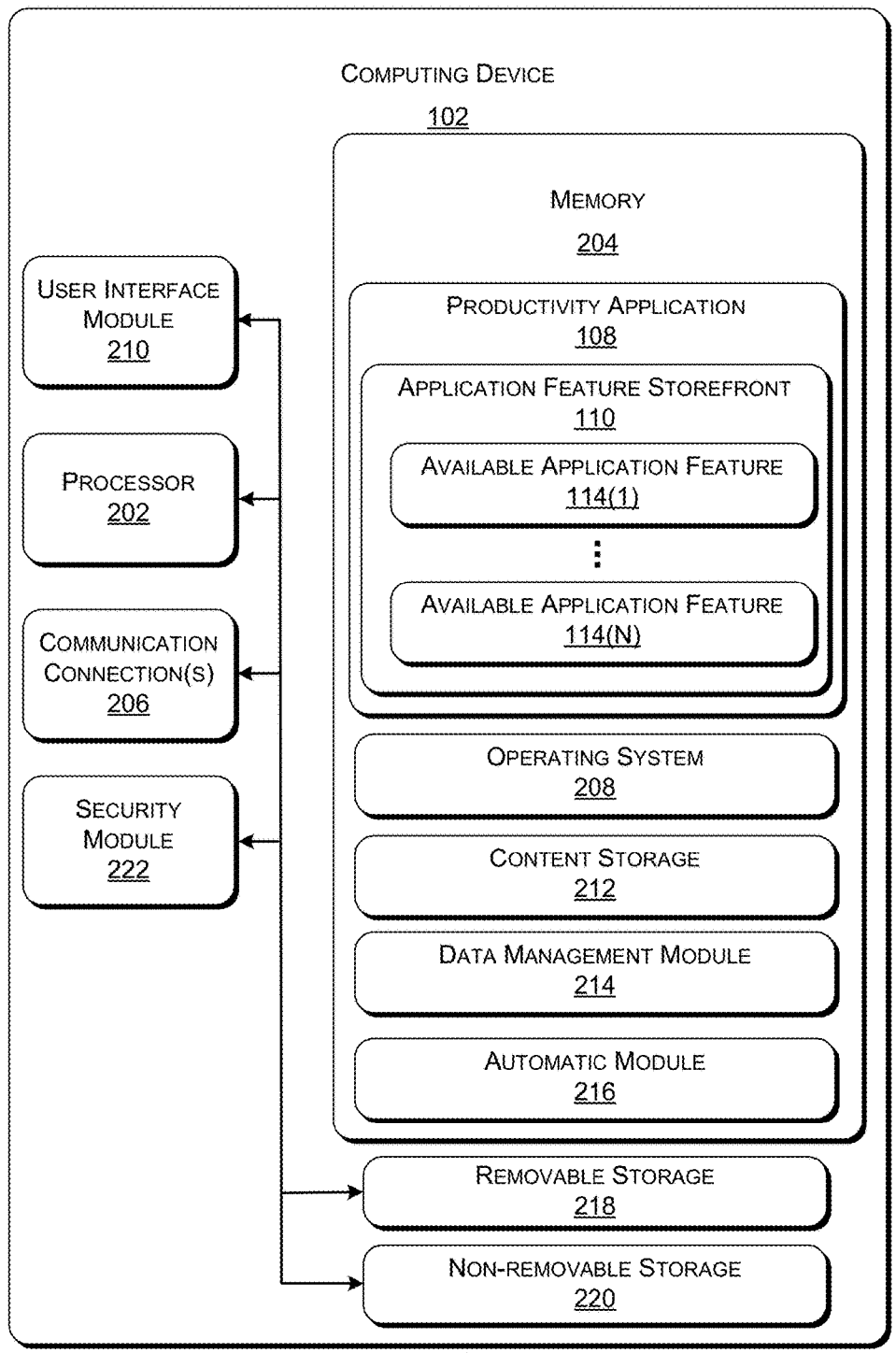
FIG. 2 is a block diagram of an exemplary computing device within the environment of FIG. 1.

FIG. 2 illustrates an example computing device 102. The computing device 102 includes, without limitation, a processor 202, memory 204, one or more communication connections 206, an operating system 208, a user interface (UI) module 210, and a content storage 212 maintained in the memory 204 and executable on the processor 202.

Turning to the contents of the memory 204 in more detail, in one implementation, the memory 204 includes the productivity application 108, the application feature storefront 110, and the one or more available application features 114(1)-114(N). In one implementation, the memory 204 also includes a data management module 214 and an automatic module 216. The data management module 214 stores and manages storage of information, such as images, return on investment (ROI), equations, and the like, and may communicate with one or more local and/or remote databases or services. The automatic module 216 allows the process to operate without human intervention.

The computing device 102 may also include additional removable storage 218 and/or non-removable storage 220 including, but not limited to, magnetic storage, optical disks, and/or tape storage. The disk drives and their associated computer-readable medium may provide non-volatile storage of computer readable instructions, data structures, program modules, and other data for the computing device 102.

Memory 204, removable storage 218, and non-removable storage 220 are all examples of computer-readable storage media (CRSM), and may include one or more of such CRSM, volatile and non-volatile, removable and non-removable media implemented in any method or technology for storage of information such as computer-readable instructions, data structures, program modules or other data. Additional types of computer-readable storage media that may be present include, but are not limited to, phase change memory (PRAM), static RAM (SRAM), dynamic RAM (DRAM), other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the application feature storefront 110 and the computing device 102, respectively. Combinations of any of the above should also be included within the scope of computer-readable storage media. CRSM is distinct from communication/transmission media, such as, modulated signals and/or carrier waves. Thus, CRSM should not be construed to include such communication/transmission media.

When executed on the processor 202, the operating system 208 and the user interface (UI) module 210 collectively facilitate presentation of a user interface on a display of the computing device 102.

The communication connection 206 may include, without limitation, a wide area network (WAN) interface, a local area network interface (e.g., WiFi), a personal area network (e.g., Bluetooth) interface, and/or any other suitable communication interfaces to allow the computing device 102 to communicate over the network(s) 104.

The computing device 102 may also include a security module 222. The security module 222 may permit the available application features 114(1)-114(N) to access the productivity application 108. The security module 222 may communicate boundaries created by the user 106 to the available application features 114(1)-114(N). In one implementation, the boundaries created may include, without limitation, accessibility to the user's personal information, content within the productivity application 108, access to calls and functions of the productivity application, access to toolbars, menus, or other UI aspects of the productivity application, content within another application available on the computing device 102, and the like.

The computing device 102, as described above, may be implemented in various types of systems or networks. For example, the computing device may be a stand-alone system, or may be a part of, without limitation, a client-server system, a peer-to-peer computer network, a distributed network, a local area network, a wide area network, a virtual private network, a storage area network, and the like.

Figure 3:
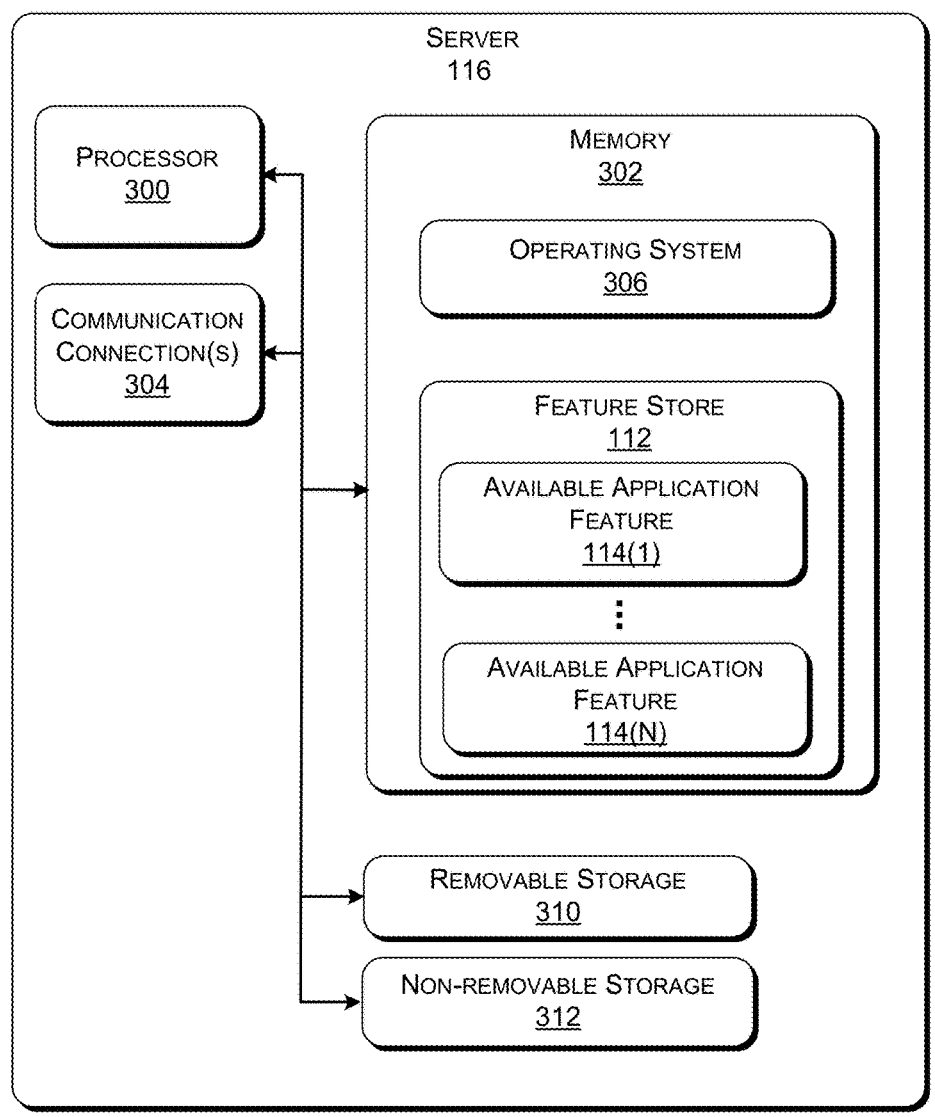
FIG. 3 is a block diagram of an exemplary server within the environment of FIG. 1.

FIG. 3 illustrates an exemplary server 116. The server 116 may be configured as any suitable system capable of providing the available features to the application feature storefront 110 on the computing device 102. In one exemplary configuration, the server 116 comprises at least one processer 300, memory 302, and communication connection(s) 304. The communication connection(s) 304 may include access to a wide area network (WAN) module, a local area network module (e.g., WiFi), a personal area network module (e.g., Bluetooth), an Ethernet connection, a universal serial bus (USB) connection, and/or any other suitable communication modules to allow the server 116 to communicate over the network(s) 104.

Turning to the contents of the memory 302 in more detail, the memory 302 may store an operating system 306, the feature store 112, and the one or more available application features 114(1)-114(N). In one implementation, the user 106 may select an available feature for purchase from the application feature storefront 110 hosted in the productivity application 108. The application feature storefront 110 may be used to access the purchased available feature from the feature store 112, for example, available feature 114(1).

The server 116 may also include additional removable storage 310 and/or non-removable storage 312. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors 300 described herein may include onboard memory in addition to or instead of the memory shown in the figures. The memory 302 may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server 116 as described above may be implemented in various types of systems or networks. For example, the server may be part of, including but is not limited to, a data center, a server farm, a client-server system, a peer-to-peer computer network, a distributed network, an enterprise architecture, a local area network, a wide area network, a virtual private network, a storage area network, and the like. For example, in one implementation, the server 116 may be associated with a web search engine such as Microsoft's Bing®.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Exemplary Feature Storefront

Figure 4:
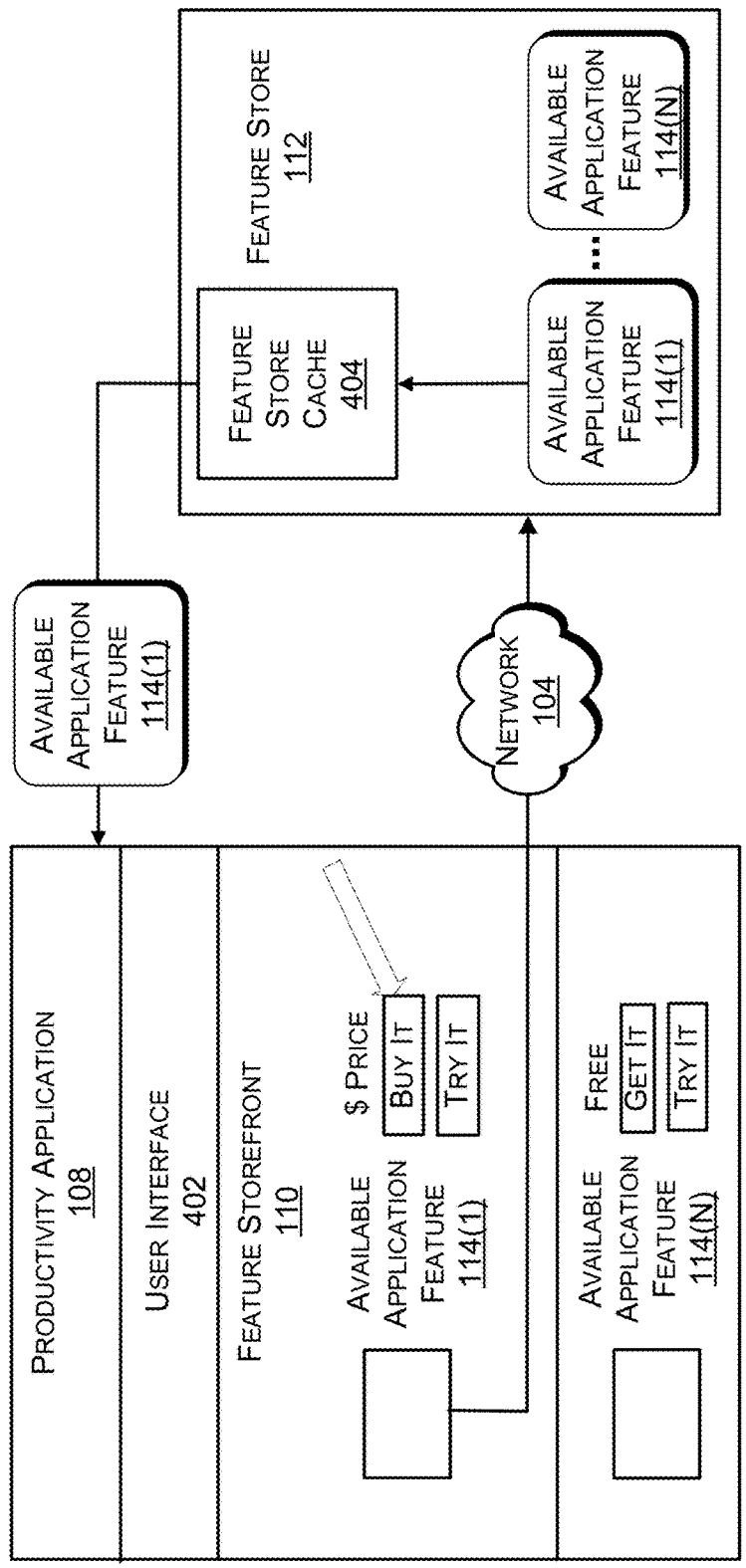
FIG. 4 is an illustrative application augmentation process within the environment of FIG. 1.

FIG. 4 illustrates a process enabling the augmentation of productivity application 108. The augmentation may include selecting one or more features and integrating those features with the productivity application 108.

As illustrated in FIG. 4, the computing device 102 may include the productivity application 108. The productivity application may host a user interface 402 and the application feature storefront 110. The user interface enables the user 106 to interact with both the productivity application 108 and the hosted application feature storefront 110. For instance, the user 106 may utilize the user interface 402 to navigate the application feature storefront 110 and input a user's search term or search terms. The user input is received through any variety of user input devices, including, but not limited to, a keyboard, a mouse, a stylus, a touchscreen, or a microphone.

As illustrated in FIG. 4, in response to the user query, the user interface 402 may present the user 106 with one or more possible features that the user may be interested in purchasing or trying out. Choosing the desired feature(s) may be based on one or more criteria. In some instances, criteria used to determine which available features to present to the user 106 via the user interface 402 may include, without limitation, accessing a social network to determine what features the user's social contacts have used and/or "liked", an expert recommendation, a recommendation by the productivity application itself, or the like. Alternatively, the productivity application 108 may determine that the user may be able to make use of one or more additional features. For example, if the user 106 continuously is misspelling words, the. feature storefront 110 may suggest one or more application features such as, a dictionary, thesaurus, or the like. In another example, if the user is opening and arranging photos, the feature storefront may suggest photo organization features.

The user 106 may select a desired feature, for example, 114(1). In one instance, the user may be presented with a group of available features. The group of features may be purchased by the user 106 as a bundle or individually.

After selecting available application feature 114(1), the selection is transmitted over network 104 to the feature store 112. The available feature store 112 retains the available features presented to and selected by the user 106. Developers and publishers may continually add available features to the available feature store 112, permitting growth and expansion. Furthermore, the available feature store 112 maintains a most current version of any available feature, ensuring that the user 106 will not immediately have to update the available feature(s) right after purchasing it.

The available application feature 114(1) may be communicated from the feature store 112 to the productivity application 108 via a feature store cache 404. The feature store cache 404 may store data from the available application feature 114(1), permitting future requests for that feature to be served faster. The productivity application 108 and the selected available application feature 114(1) may be designed such that the user 106 is not able to identify the available feature as an added feature once integrated.

Instead, the available feature is integrated as though the feature was a part of the original productivity application 108.

Figure 5:
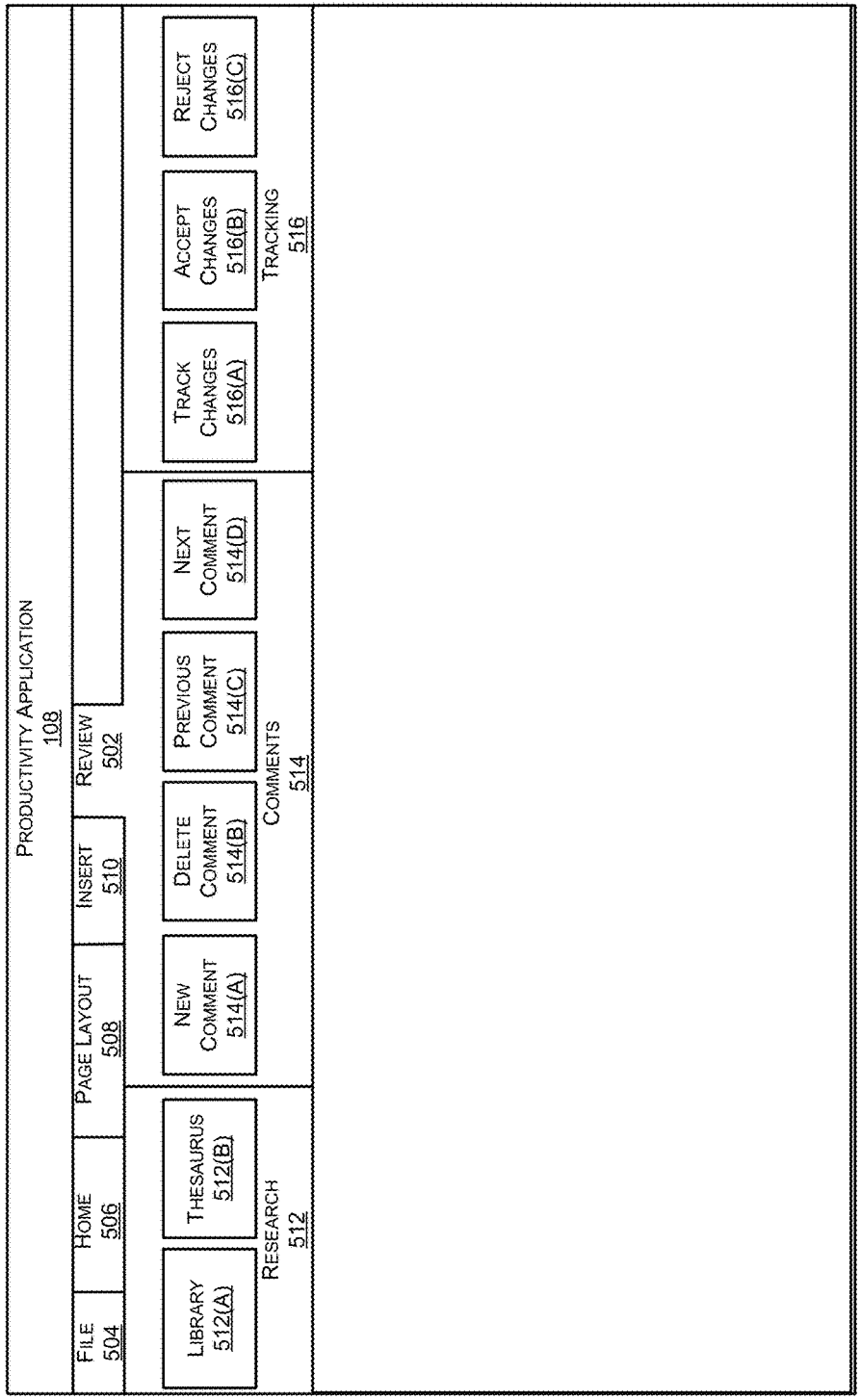
FIGS. 5 and 6 are illustrative of an integration of a purchased available feature within the environment of FIG. 1.

FIG. 5 illustrates an exemplary integration of a purchased available application feature 14(1). As illustrated in this example, the user 106 may purchase a review feature 502 through the hosted application feature storefront 110. In this example, the review feature is presented in a tabular format, a review tab, similar to those features included on the original productivity application 108. In this example, there is no distinction between the purchased review tab 502, and a file tab 504, a home tab 506, a page layout tab 508, and an insert tab 510 of the original application. The purchased review features 502 represented in the review tab may include, without limitation, features such as a research feature 512, a comment feature 514, and a tracking feature 516. Furthermore, each feature may include review functions specific to the associated feature. For example, the research feature may include a library function 512(A) and a thesaurus function 512(B); the comment feature may include a new comment function 514(A), a delete comment function 514(B), a previous comment function 514(C), and a next comment function 514(D); and the tracking feature may include a track changes function 516(A), an accept changes function 516(B), and a reject changes function 516(C).

Figure 6:
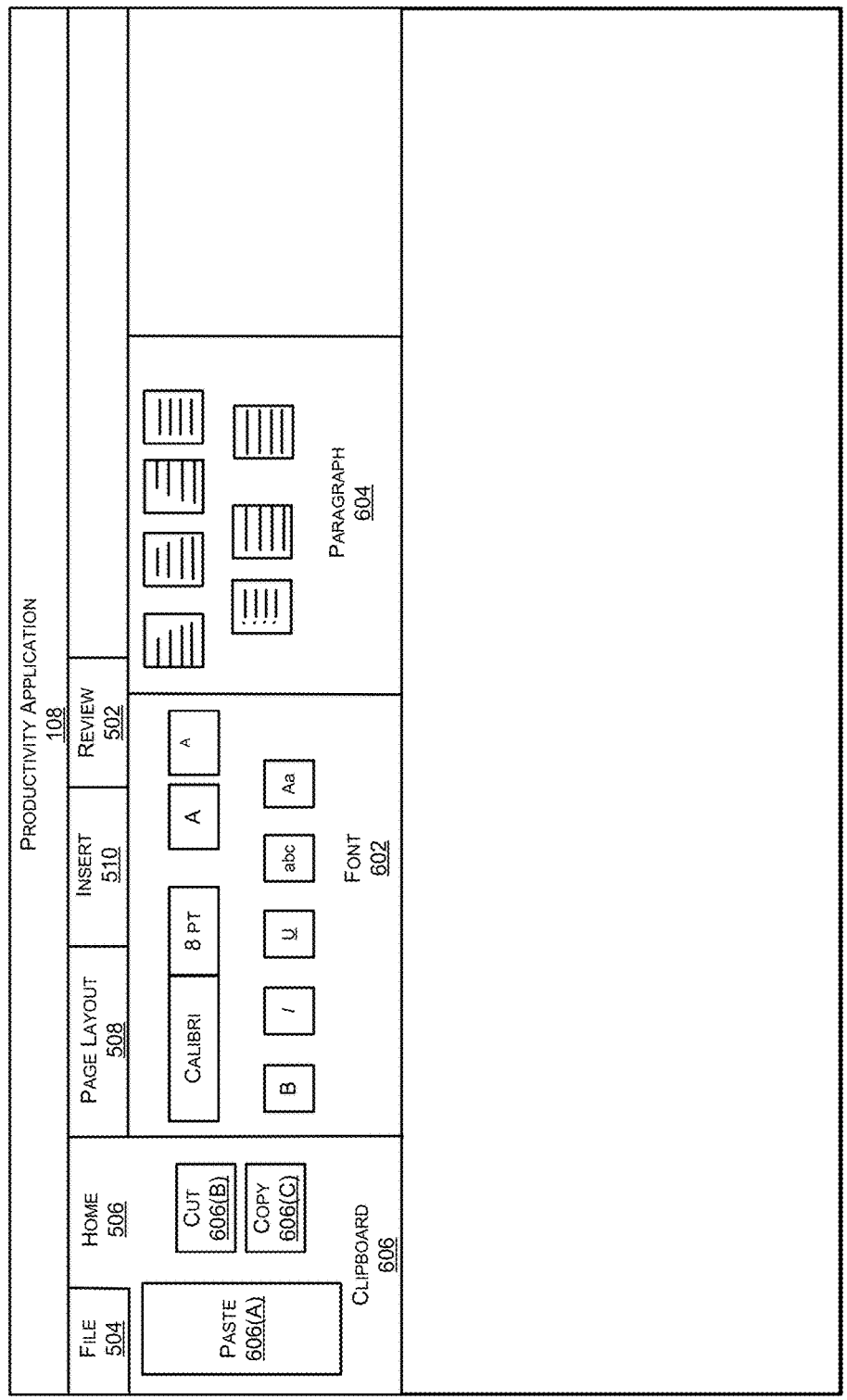

FIG. 6 illustrates another exemplary integration of a purchased available application feature 114(N). In FIG. 6, the home tab 506 and a font feature 602 and a paragraph feature 604 may be included on the productivity application 108. The user 106 may wish to add additional features, such as, forexample, a clipboard feature 606. The feature 606 may further include a paste function 606(A), a cut function 606(B), and a copy function 606(C).

Figure 7:
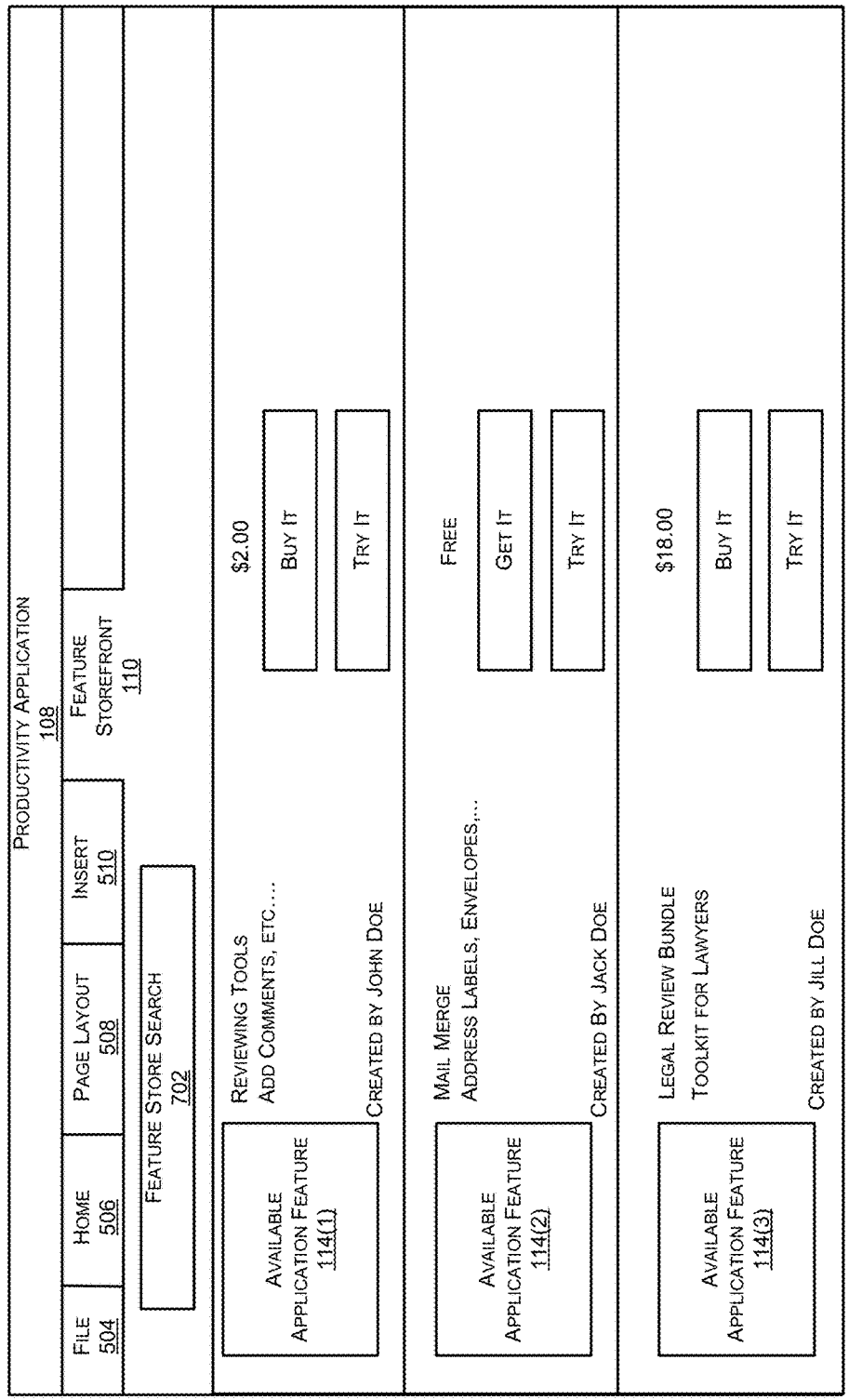
FIGS. 7 and 8 are illustrative of a feature storefront hosted within a productivity application within the environment of FIG. 1.

FIG. 7 illustrates one example in which the feature storefront 110 may be hosted within the productivity application 108. As illustrated in this example, the feature storefront may be presented in tabular form similar to the features of the original productivity application 108. The feature storefront may include a feature store search 702 option. The user 106 may search available features within the feature store 112. For example, the user 106 may need to review a document, some of which may be specific to legal document review. The user 106 may enter a search query, for example, "review tools law". A search of the feature store 112 may return to the user options including, without limitation, available application feature 114(1), available application feature 114(2), and available application feature 114(3). As illustrated, the available features are presented to the user 106 within the productivity application 108. In this example, the available application feature 114(1) is a reviewing feature and is available for purchase as well as for trial. If the user 106 would like to buy the reviewing feature, the user would select the "buy it" option and would be charged the $2.00 price listed. However, if the user would like to try the reviewing feature out prior to purchase, the user 106 may select the "try it" option. Available application feature 114(2) is shown as a mail merge feature and is available to the user for free. Therefore, to integrate this feature with the productivity application 108, the user 106 simply selects the "get it" option. The user 106 may also try the feature out by selecting the "try it" option prior to integrating the feature with the productivity application. Available application feature 114(3) illustrates a bundle of features. In this example, the features are a toolkit for lawyers and are available for both a trial as well as purchase. As illustrated in available application feature 114(3), a bundle of features may be more expensive than a single feature, but may be cheaper purchased as a bundle than purchase separately. However, the user 106 may opt to purchase each feature separately should they desire. A bundle may be designated by a developer of the application features or by one or more experts. A bundle may be designed by other users.

The features within the storefront may contain recommendations or "votes" by the user's friends or by experts, for example, for that particular feature.

Figure 8:
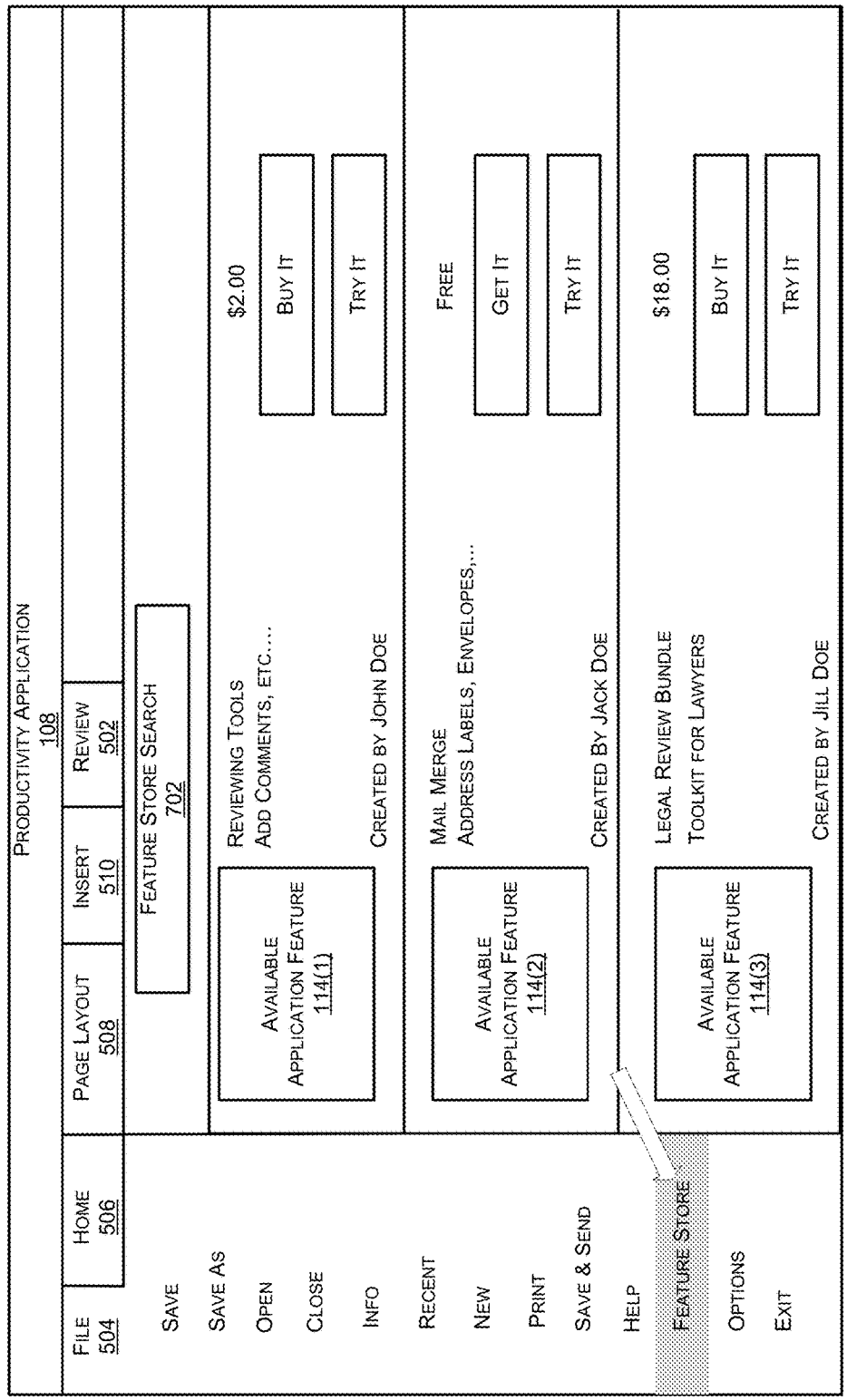

FIG. 8 illustrates another example in which the feature storefront 110 may be hosted within the productivity application 108. In this example, the feature storefront 110 may be hosted within the productivity application 108 under a file tab 504, menu, or other UI interface. The user may select the feature storefront 110 from the file tab 504. The user may perform a search of the feature store 112 similar to that discussed above with respect to FIG. 7, receiving the same example available application features 114(1), 114(2), and 114(3) from the feature store 112 in response to the search.

Productivity Application Security

Figure 9:
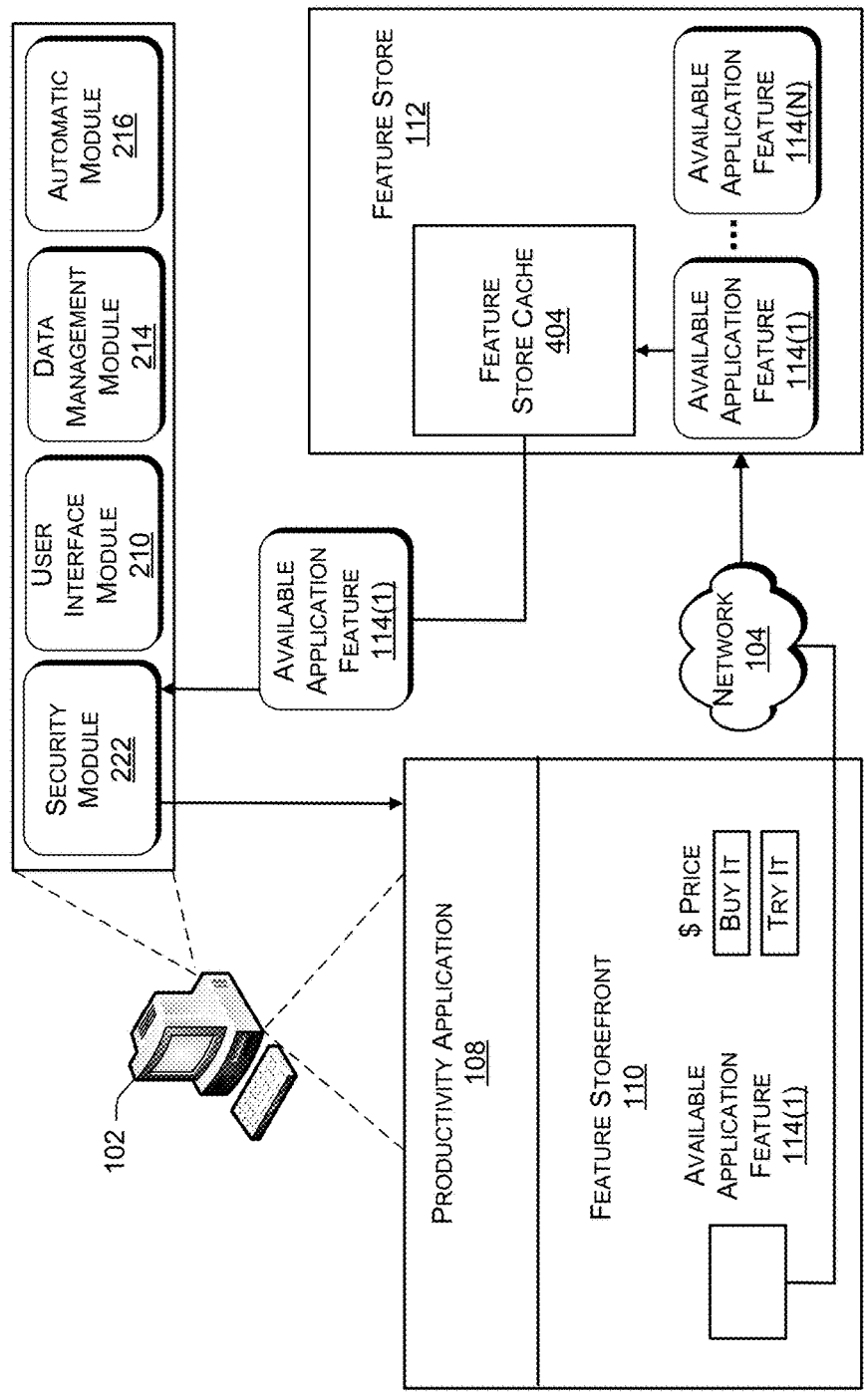
FIG. 9 is illustrative of a security module within the environment of FIG. 1.

During an installation process, a selected available feature may request access to particular information or functions available on the user's computing device or within the productivity application 108. In some instances, the computing device 102 and/or the productivity application 108 may create or have previously created one or more security boundaries to shield the user's personal information from being accessed by available application features 114(1)-114(N). For example, as illustrated in FIG. 9, the available application feature 114(1) purchased from the feature store 112 may pass through the security module 222 prior to installing the feature on the productivity application 108. In some instances, the available application feature 114(1) may request access to the user's email during the integration process. Such a request may be denied by the productivity application as a result of a previous boundary set by the user 106. For example, the user 106 may have previously indicated to the productivity application never to allow third party applications access to the user's email. Therefore, during the installation process, the available application feature 114(1) may attempt to access the user's email, only to be denied. Instead, only gaining access to the user's official contact list. Alternatively, the user may be prompted whether to grant the new application feature access to some or all of the secure data/functions at installation time.

Exemplary Application Feature Store in an Enterprise Environment

A feature store may be utilized in an enterprise environment. The feature store may be accessed by one or more users within the enterprise environment through a feature storefront hosted within the productivity application, similar to that described above with respect to FIGS. 1-8. In an enterprise environment, a central computing device may monitor the environment and determine whether requested features have already been purchased from the feature store.

Figure 10:
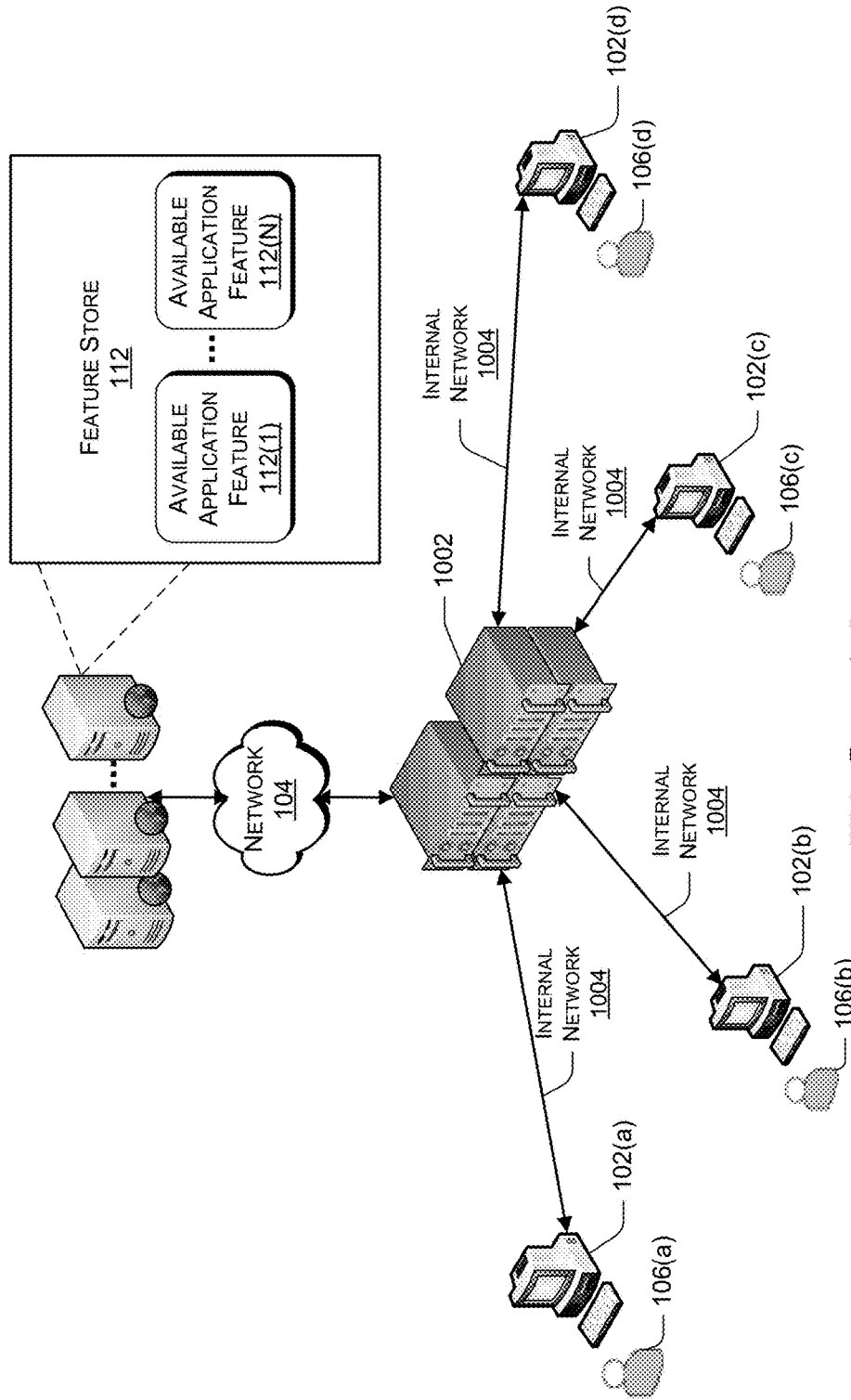
FIG. 10 is illustrative of an enterprise environment for an application feature storefront and an application feature store.

FIG. 10 illustrates an exemplary enterprise environment 1000 associated the with feature store 112. As illustrated in FIG. 10, the enterprise environment may include one or more computing device 102(a), 102(b), 102(c), and 102(d), one or more users 106(a), 106(b), 106(c), and 106(d), a central computing device 1002, the network 104, the server 116, the feature store 112, and the available application features 114(1)-114(N). Each computing device may communicate with the central computing device over an internal network 1004. Each computing device 102(a)-102(d) may have previously had a productivity application installed. The productivity application may be similar to the productivity application 108, described above, in that the productivity application may be a base application with a select number of available features.

The productivity application on each computing device in the enterprise environment may be maintained by the central computing device 1002. For example, if additional or alternative functionality is desired, the central computing device may provide the additional or alternative functionality information over the internal network 1004. For example, the central computing device may filter or limit the features shown in the feature store. Or, the central computing device may manage the licensing for pre-paid features and not require payment from the user.

In an enterprise environment, should the user, for example user 106(a) on computing device 102(a), like to add additional features to the productivity application, the internal network 1004 would communicate that request to the central computing device 1002.

Figure 11:
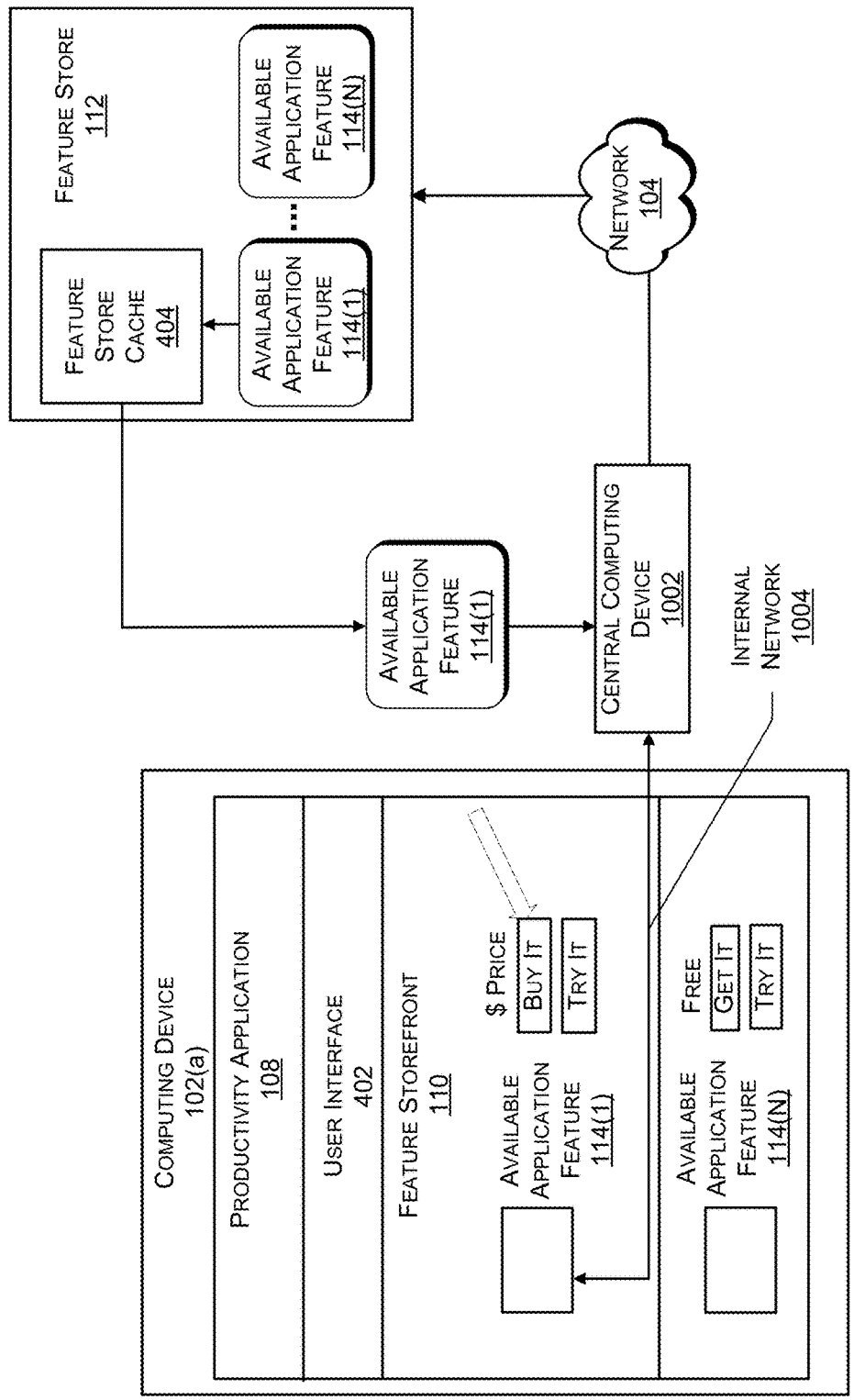
FIG. 11 is illustrative an exemplary selection of an available feature within the environment of FIG. 10.

FIG. 11 illustrates an exemplary selection of an available feature within an enterprise environment. The user 106 may perform a search using the feature storefront 110 similar to that described above with respect to FIG. 4. In the enterprise environment, the selection is transmitted over the internal network 1004 to the central computing device 1002. The central computing device may determine whether the available application feature has already been purchased from the feature store 110, and is available for download and install by members of the enterprise. For example, when the productivity application was originally installed on each of the computing devices in the enterprise environment, additional features may have been pre-purchased and made available to users of the enterprise for future download and install. The available features may be stored within the central computing device 1002 or may be accessed in the feature store 112.

However, in some instances, a user within the enterprise environment may wish to purchase an available application feature 114(1)-114(N) that has not been previously purchased. In this instance, the selection made from the hosted feature storefront 110 may be transmitted over the internal network 1004 to the central computing device 1002. The central computing device 1002 may communicate the request to the feature store 112. During the communication, the central computing device may include purchase information including, without limitation, credit card information, bank account information, a registration or reference number with pre-established purchase information, and the like. In some instance, the central computing device 1002 may determine whether the requested application feature is an approved feature within the enterprise environment. If the feature is not approved, the central computing device may deny the user's request. Or, the feature may not be displayed in the feature store. If the requested feature is approved, the purchased available feature may be transmitted to the computing device via the central computing device 1002, enabling other computing devices within the enterprise environment 1000 to access the purchased available application feature as well. For example, as illustrated in FIG. 11, if computing device 102(a) selects available application feature 114(1) from the feature storefront 110, the selection is communicated over the internal network 1004 to the central computing device 1002. The central computing device 1002 determines that the desired features have not been previously purchased, and forwards the request to the feature store over network 104. The available application feature 114(1) is purchased and returned to the central computing device 1002 for distribution to at least computing device 102(a). As discussed above, the productivity application 108 and the selected available application feature 114(1) may be designed such that the user 106 is not able to distinguish the available feature as an added feature once integrated. Instead, the available feature is integrated as though the feature was a part of the original productivity application 108.

Exemplary Process

Figure 12:
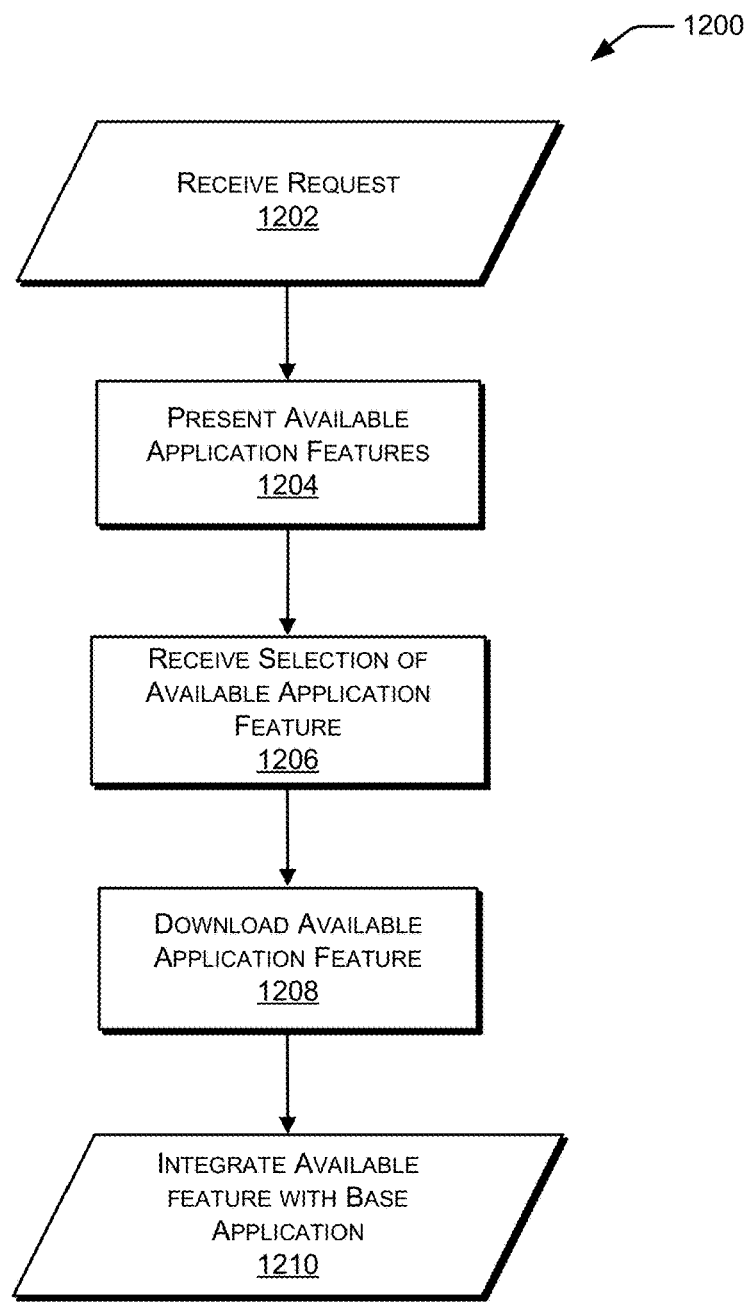
FIG. 12 is a flow chart of an exemplary use outlining an application feature selection within the environment of FIG. 1.

FIG. 12 illustrates a flow diagram of an example process 1200 outlining the feature storefront and feature store according to some implementations herein. In the flow diagram, the operations are summarized in individual blocks. The operations may be performed in hardware, or as processor-executable instructions (software or firmware) that may be executed by one or more processors. Further, the process 1200 may, but need not necessarily, be implemented using the framework of FIG. 1.

At block 1202, a request from the user 106 is received by the feature store via the feature storefront. In some implementations, the input is in a natural language format. However, in other implementations, the input may be in any suitable format usable by the hosted feature storefront 110 and the feature store 112.

At block 1204, one or more available application features are presented to the user. The available application features may include a single feature, feature(s) for purchase, feature(s) available to the user for free, a bundle of features, or the like. In some instances, the available application features may be selected based upon accessing a social network to determine what features the user's social contacts have used and/or liked, an expert recommendation, a recommendation by the productivity application itself, or the like.

At block 1206, the user selection of an available application feature is received. The selection is transmitted to the feature store.

At block 1208, the feature store returns the selected available application feature to the computing device for download.

At block 1210, the computing device downloads and installs the available application feature on the computing device. The available feature is integrated with the base application as though the feature was a part of the original base application.

CONCLUSION

Although an indication process enabling the augmentation of a productivity application has been described in language specific to structural features and/or methods, it is to be understood that the subject of the appended claims are not necessarily limited to the specific features or methods described. Rather, the specific features and methods are disclosed as exemplary implementations.

What is claimed is:

1. A computer-implemented method comprising:
under control of one or more processors configured with executable instructions:
presenting a user interface of a productivity application, the user interface of the productivity application including an application storefront of an application feature store;
the application storefront displaying one or more controls corresponding to one or more application features available for selection;
receiving a selection of one of the controls corresponding to an application feature available within the application feature store;

in response to receiving the selection, integrating the selected application feature into the productivity application;

determining that the productivity application comprises one or more security boundaries;

executing the selected application feature within the productivity application, while enforcing the one or more security boundaries to prevent the selected application feature from accessing features or data protected by the one or more security boundaries; and executing another application feature within the productivity application without enforcing the one or more security boundaries.

2. The computer-implemented method of claim 1, further comprising searching the contents of the application feature store to determine the one or more application features to display on the application storefront in response to the search.

3. The computer-implemented method of claim 1, wherein the one or more application features displayed on the application storefront are determined by the productivity application.

4. The computer-implemented method of claim 1, further comprising determining that the selected application feature is accessible from a local area network prior to accessing the application feature store, and accessing the selected application feature from the local area network.

5. The computer-implemented method of claim 1, further comprising accessing the selected application feature from the application feature store.

6. The computer-implemented method of claim 1, further comprising after integrating the selected application feature into the productivity application, displaying a representation of the selected application feature within the productivity application.

7. The computer-implemented method of claim 6, wherein the representation of the selected application feature is a tabular representation and is indistinguishable from another application feature representation within the productivity application.

8. The computer-implemented method of claim 6, wherein the representation of the selected application feature is an icon usable to initiate the selected application feature.

9. The computer-implemented method of claim 1, wherein the application storefront is further configured to display a "buy it" option usable to purchase the selected application feature, a "try it" option usable to try the selected application feature, and/or a "get it" option usable to access the selected application feature for free.

10. A system comprising:
memory;
one or more processors coupled to the memory;
an application stored in the memory and operable on the one or more processors, the application comprising:
an integrated portal configured to access a feature store, the feature store comprising one or more application features compatible with the application; and
a representation of an application feature selected from the feature store and installed within the application, the representation consistent with representations of one or more application features previously installed within the application; and
a security module configured to:
determine one or more boundaries associated with the application;
during execution of the selected application feature within the application, enforcing the one or more boundaries to prevent the selected application feature from accessing data or features secured by the one or more boundaries; and
during execution of an application feature included with an initial installation of the application, allowing execution without enforcing the one or more boundaries.

11. The system of claim 10, wherein the integrated portal is further configured to present the one or more application features compatible with the application and to facilitate user-selection of a desired application feature.

12. The system of claim 10, wherein the integrated portal is further configured to include a search option enabling a search of available application features within the feature store.

13. The system of claim 10, wherein the integrated portal is disposed within a tab, the tab representing an original application feature.

14. The system of claim 10, wherein the application is a base productivity application comprising a limited number of original features.

15. A system as recited in claim 10, wherein the data or features secured by the one or more boundaries comprise one or more of:
user personal information;
content within the application;
calls and functions of the application;
user interface aspects of the application; or
content within another application.

16. One or more computer-readable storage media storing computer-executable instructions that, when executed on one or more processors, cause the one or more processors to perform operations comprising:
presenting a user interface usable to interact with a feature storefront;
receiving a selection of an application feature available from the feature storefront;
determining that a base application comprises one or more security boundaries;
in response to receiving the selection:
integrating the application feature with the base application based, at least in part, on the one or more security boundaries; and
presenting a representation of the application feature within the base application;
during execution of the application feature within the base application, enforcing the one or more security boundaries to prevent the application feature from accessing data or features protected by the one or more security boundaries; and
during execution of an application feature that was included with the base application, not enforcing the one or more security boundaries.

17. The one or more computer-readable storage media of claim 16, wherein presenting a representation of the application feature within the base application comprises presenting the representation of the application features such that the application feature is identified in a similar format to one or more original application features.

18. The one or more computer-readable storage media of claim 16, further comprising:
displaying a feature store search option on the feature storefront;
receiving one or more natural language search terms in the search option; and
presenting search results comprising one or more available features corresponding to the search terms.

19. The one or more computer-readable storage media of claim 18, wherein each of the one or more available features presented comprises an individual application feature available for purchase, an individual application feature available for free, and/or a bundle of application features available for purchase as a group.

20. One or more computer-readable storage media as recited in claim 16, wherein the data or features protected by the one or more security boundaries comprise one or more of:
- user personal information;
- content within the base application;
- calls and functions of the base application;
- user interface aspects of the base application; or
- content within another application.

* * * * *